US009280845B2

(12) United States Patent
Balci et al.

(10) Patent No.: US 9,280,845 B2
(45) Date of Patent: Mar. 8, 2016

(54) OPTIMIZED MULTI-PASS RENDERING ON TILED BASE ARCHITECTURES

(71) Applicant: QUALCOMM Incorporated, San Diego, CA (US)

(72) Inventors: Murat Balci, Orlando, FL (US); Christopher Paul Frascati, Oviedo, FL (US); Avinash Seetharamaiah, Chuluota, FL (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 14/154,996

(22) Filed: Jan. 14, 2014

(65) Prior Publication Data

US 2015/0187117 A1 Jul. 2, 2015

Related U.S. Application Data

(60) Provisional application No. 61/921,145, filed on Dec. 27, 2013.

(51) Int. Cl.
*G06T 15/00* (2011.01)

(52) U.S. Cl.
CPC .................. *G06T 15/005* (2013.01)

(58) Field of Classification Search
CPC .................................................. G06T 15/005
See application file for complete search history.

(56) References Cited

U.S. PATENT DOCUMENTS

| 5,778,432 | A * | 7/1998 | Rubin et al. | 711/135 |
| 6,952,206 | B1 | 10/2005 | Craighead | |
| 7,170,513 | B1 | 1/2007 | Voorhies et al. | |
| 2005/0225670 | A1 * | 10/2005 | Wexler et al. | 348/441 |
| 2010/0007662 | A1 | 1/2010 | Cox et al. | |
| 2011/0320771 | A1 * | 12/2011 | Mejdrich et al. | 712/201 |
| 2012/0242672 | A1 | 9/2012 | Larson | |
| 2013/0135322 | A1 | 5/2013 | Seetharamaiah et al. | |
| 2014/0118370 | A1 * | 5/2014 | Hakura et al. | 345/522 |

OTHER PUBLICATIONS

Engelhardt et al.,"Granular visibility Queries on the GPU," I3D '09 Proceedings of the 2009 symposium on Interactive 3D graphics and games, Feb. 27, 2009, XP058022738, pp. 161-167.
Heil et al.,"Selective Dual Path Execution," Department of Electrical and Computer Engineering, Technical Report, Nov. 8, 1996, XP002739344, 29 pp.
Merry "Performance Tuning for Tile-Based Architectures," In: "OpenGL Insights," Jul. 2012, Taylor & Francis Group, LLC ISBN: 9781439893777, pp. 323-335.
International Search Report and Written Opinion from International Application No. PCT/US2014/068573, dated May 20, 2015, 12 pp.

* cited by examiner

*Primary Examiner* — Maurice L McDowell, Jr.
(74) *Attorney, Agent, or Firm* — Shumaker & Sieffert, P.A.

(57) ABSTRACT

The present disclosure provides systems and methods for multi-path rendering on tile based architectures including executing, with a graphics processing unit (GPU), a query pass, executing, with the GPU, a condition true pass based on the query pass without executing a flush operation, executing, with the GPU, a condition false pass based on the query pass without executing a flush operation, and responsive to executing the condition true pass and the condition false pass, executing, with the GPU, a flush operation.

22 Claims, 7 Drawing Sheets

OPTIMIZED MULTI-PASS RENDERING ON TILED BASE ARCHITECTURES

This application claims the benefit of U.S. Provisional Application No. 61/921,145, filed Dec. 27, 2013, the entire content of which is incorporated herein by reference.

TECHNICAL FIELD

This disclosure relates to techniques for graphics processing and more particularly relates to techniques for rendering primitives in graphics processing.

BACKGROUND

A graphical processing unit (GPU) may perform tile based rendering and be used to render a three dimensional scene. Because such rendering of three-dimensional scenes can be very memory bandwidth-intensive, a specialized graphics memory (GMEM) may be located close to the GPU core. The GPU core generally renders a scene using the GMEM. The GPU or central processing unit (CPU) may then resolve the contents of the GMEM, which contains the scene, to the system memory. In other words, data representing the scene may be transferred from GMEM to system memory. Because the size of the GMEM in a mobile environment may be limited due to physical area constraints and memory bandwidth, the GPU may split a scene to be rendered into smaller parts so that those smaller parts may be individually rendered. In particular, the GPU may render the scene by dividing the scene into portions that may be rendered into the GMEM and individually rendering each portion of the scene into the GMEM.

SUMMARY

In general, this disclosure describes techniques for optimizing graphics rendering for tile-based graphics processing unit (GPU) architectures. By reducing communication and data transfer between a central processing unit (CPU) and the GPU when executing rendering instructions, a tile-based GPU can improve its performance in rendering graphical objects and scenes. In particular, a GPU configured for tile-based rendering can perform a greater amount of rendering of a graphical scene on the GPU itself without having to wait for CPU interaction, which may improve rendering performance of the GPU.

In one example, the disclosure describes a method that includes executing, with a graphics processing unit (GPU), a query pass, executing, with the GPU, a condition true pass based on the query pass without executing a flush operation, executing, with the GPU, a condition false pass based on the query pass without executing a flush operation, and responsive to executing the condition true pass, and the condition false pass, executing, with the GPU, a flush operation.

In another example, the disclosure describes a device that includes a GPU configured to execute a query pass, execute a condition true pass based on the query pass without executing a flush operation, execute a condition false pass based on the query pass without executing a flush operation, and responsive to executing the condition true pass, and the condition false pass, executing a flush operation.

In another example, the disclosure describes a device that includes means for executing a query pass with a graphics processing unit (GPU), means for executing a condition true pass based on the query pass without executing a flush operation with the GPU, means for executing a condition false pass based on the query pass without executing a flush operation with the GPU, and responsive to executing the condition true pass and the condition false pass, means for performing a flush operation with the GPU.

In another example, the disclosure describes a computer-readable storage medium. The computer-readable storage medium having stored thereon instructions that upon execution cause one or more processors to execute a query pass, executing a condition true pass based on the query pass without executing a flush operation, executing a condition false pass based on the query pass without executing a flush operation, and responsive to executing the condition true pass, and the condition false pass, executing a flush operation.

DETAILED DESCRIPTION

A graphics processing unit (GPU) may be used to render a three-dimensional (3D) scene. Because such rendering of 3D scenes can be very memory bandwidth-intensive, a specialized graphics memory (GMEM) may be used. GMEM may be located close to the graphics-processing core of the GPU so that it has a very high memory bandwidth (i.e., read and write access to the GMEM is relatively fast). A scene can be rendered by the graphics processing core of the GPU to the GMEM, and the scene can be resolved from GMEM to memory (e.g., a frame buffer) so that the scene can then be displayed at a display device. However, because the size of the GMEM may be limited due to physical area constraints, the GMEM may not have sufficient memory capacity to contain an entire three-dimensional scene (e.g., an entire frame).

In some examples, a GPU or other processing device may be configured to split a 3D scene into tiles, so that each tile making up the scene can fit into GMEM. This is referred to as tile-based rendering or "binning" As an example, if the GMEM is able to store 512 kB of data, then a scene may be divided into tiles such that the pixel data contained in each tile is less than or equal to 512 kB. In this way, the GPU or other processor may render the scene by dividing the scene into tiles that can be rendered into the GMEM and individually rendering each tile of the scene into the GMEM, storing the rendered tile from GMEM to a frame buffer, and repeating the rendering and storing for each tile of the scene. Accordingly, the GPU or other processor can render the scene tile-by-tile using multiple rendering passes to render each tile of the scene.

In some examples, tile-based rendering may be performed in several steps. For example, a GPU implementing a tile-based architecture may initially process, or preprocess, an entire scene during a binning pass to define a number of bins, also referred to as "tiles." The binning pass may be followed by a series of rendering passes, during which each of the defined tiles are rendered. In some examples, each of the rendering passes is completed in three stages: (1) clear/unresolve, (2) render, (3) resolve. During the clear/unresolve stage, the GPU may initialize GMEM for a new tile and store values into GMEM that have been read from an external memory. During rendering, the GPU may recreate the polygons associated with a current tile, as well as generate pixel values and finish a current tile, such that the tile can be displayed on a display. The resolve step may involve the GPU copying the contents of the on-chip memory (GMEM) to a memory external to the GPU, such as a buffer for used by a display in displaying finished scenes.

During the binning pass, the GPU may generate polygons (e.g., triangles) that make up a scene and sort the polygons into a plurality of "bins." As described herein, the bins defined during the binning pass are synonyms for tiles of a final scene presented on a display (e.g., sometimes referred to as "screen tiles"). For example, each bin represents a portion, or tile of the final scene (e.g., a predefined portion of a frame of video data, computer-generated graphics image, still image, or the like). Accordingly, the terms "bin" and "tile" may be used herein interchangeably. The tiles making up a scene can each be associated with a bin in memory that stores the primitives included in each respective tile. A bin is a portion of a memory a portion of a picture or frame, e.g., the primitives in a tile of a picture or frame. Rendering a tile of the scene into the GMEM may include executing commands to render the primitives in the associated bin into the GMEM. A binning pass, of the GPU, can sort the primitives making up a scene into the appropriate bins. The binning pass, of the GPU, may also create visibility streams for each bin that indicates whether any primitives in the bin will be visible in the final rendered scene or not. A visibility stream is a stream of bits that indicates whether or not a primitive is visible in each tile when rendered.

The commands to render the primitives in a bin may be loaded in an indirect buffer. The indirect buffer may be part of, for example, GMEM, a frame buffer, or other memory. Generally, the indirect buffer may be part of system memory, however. The GPU may execute the commands stored in the indirect buffer to render the primitives included in the bin. If the visibility stream for a bin indicates that the bin does not contain any visible primitives (i.e., all of the primitives in the bin will not be visible in the final rendered scene), performance may be improved if the GPU does not render the primitives in the bin by skipping execution of the instructions in the indirect buffer associated with the bin.

In some examples of multi-pass rendering, a scene and associated objects may be rendered multiple times. Each time the object is drawn, an additional aspect of object's appearance may be calculated and combined with the previous results. Generally, this may involve a coarse initial rendering and a detailed second rendering pass based on the query results of first coarse pass. The query pass results may include data, e.g., counter values or heuristics that indicate if the binning pass should be executed. For example, if an object to be rendered is simple (relatively speaking) then it may be advantageous to perform the query pass followed by only a rendering pass. Alternatively, if an object to be rendered is complex (relatively speaking) then it may be advantageous to perform the query pass followed by a binning pass and a rendering pass.

In some examples, the GPU may also be configured to perform operations during the binning pass to determine which of the polygons are visible in the scene, such as performing a depth test to determine whether a polygon covers another polygon. Upon determining which polygons are visible in the scene, the GPU can generate a stream of data referred to as a "visibility stream." The visibility stream may include a value for each of the polygons of the scene, and the value may represent whether the polygon is visible (e.g., a value of "1" may indicate that the polygon is visible and a value of "0" may indicate that the polygon is not visible).

After the binning pass, the GPU may separately render each of the tiles by processing each of the tiles again. In some examples, the GPU uses the visibility stream generated during binning to omit, or skip, the rendering of invisible polygons. Accordingly, only the visible polygons, i.e., those polygons that contribute to the final scene, are processed and rendered. The GPU may carry out the rendering process on each of the tiles in three stages: (1) clear/unresolve, (2) rendering, and (3) resolve.

During the clear/unresolve stage, the GPU may initialize local memory resources (e.g., local to the GPU or on-chip GPU memory, which may also be referred to as GMEM) for a new tile. In some examples, the GPU initializes GMEM by performing a clear process to clear GMEM. In other examples, the GPU may initialize GMEM by performing an unresolve process. During an unresolve process, the GPU may read values into GMEM from an external memory. The GPU may implement the unresolve process when only a portion of a scene is being updated with new data. For example, pixel data that is not changed from one scene to another may be preserved across more than one scene (e.g., more than one frame of graphics data) using the unresolve process.

During rendering, the GPU may recreate the polygons associated with a current tile, as well as generate pixel values and finish a current tile, such that the tile can be displayed on a display. For example, the GPU may generate the appropriate pixel values during the rendering stage so that the pixel data that is displayed accurately represents the scene. In some examples, the GPU may store the final pixel values in the local (to the GPU) or on-chip GPU memory, i.e., GMEM.

After rendering, the GPU may resolve the current tile by copying the contents of the on-chip memory to a memory external to the GPU, such as a buffer for used by a display in displaying finished scenes. The GPU must typically wait to resolve pixel data until the pixel data has finished rendering. For example, if the GPU resolves, or copies, pixel data from GMEM to external memory before the pixels have been fully rendered, the resulting scene will not exhibit the appropriate attributes of the intended scene when displayed.

In some examples, the GPU may wait to resolve a tile until the entire tile has finished rendering. For example, the GPU may wait until an entire tile is ready for display before copying the tile from GMEM to an external memory. The GPU repeats the process until the entire scene is finished by clearing/unresolving GMEM for the next tile, rendering the next tile, and resolving the next tile.

On tile-based architectures, binning runs on both passes and binning related data may be generated for both passes, which may involve extra flush points and mid-scene resolves. This may be the case even when an application's performance is not increased by this behavior over a single pass scenario.

Accordingly, in some cases, a multi-pass rendering may include performing a first pass rendering, query, and a second pass rendering. A query may be any request for information triggered by an application. For example, an application may render something on the API side, flush the object rendered to the graphics card. This completes that particular rendering. Then a query may be sent. The query may be the number of pixels passed when the render was flushed to the graphics card from the API. The query can be any request for information on the state of the last rendering or the current rendering job being performed that is supported by the hardware. In some cases, an application may render something, trigger a query, and only send data based on the query result. In accordance with some examples of the instant application, the application may send a query and multiple level 2 indirect buffers (IB2s). IB2s contain commands for various aspects of the rendering pipeline. For example, IB2s may contain preamble commands that are executable by a GPU such as commands that initializes a static state of the GPU and sets the initial rendering state of the GPU. A rendering state of the GPU may include GPU settings that may change based on the particular application. IB2s may include a series of state commands and draw commands for drawing triangles in a loaded bin. Each draw command may instructs a GPU to draw a triangle in accordance with a graphics processing pipeline. The IB2 68s may impact the behavior of the graphics processing pipeline executed by the GPU. For example, state commands may change the color, polygon mode (e.g., points instead of solids or lines), blending (on/off), depth testing (on/off), texturing (on/off), culling, clipping, and other logical operations. The IB2 state commands may be issued on a per triangle (or per primitive) basis.

In an example, the application may send one IB2 for each possible query result. Accordingly, commands for various aspects of a rendering pipeline for each possible query result may be sent. In one example, two query results may be possible, "true" and "false." Accordingly, the application may send two IB2s, one IB2 for a "true" query result and one IB2 for a "false" query result. Thus, commands for various aspects of a rendering pipeline for the "true" query result may be sent and commands for various aspects of a rendering pipeline for the "false" query result may be sent. The application sends both possibilities, the IB2 for the "true" query result and the IB2 for the "false" query result.

Because the application sends both the IB2 for the "true" query result and the IB2 for the "false" query result the application does not need to wait to send data based on the query result. Rather, the GPU will have both the IB2 for the "true" query result and the IB2 for the "false" query result sent by the application and it may wait for the result of the query. Thus, rather than have the application wait, the GPU may wait for the query results and then the GPU may execute the query pass. The GPU may execute a condition true pass if the result of the query pass is "true." Additionally, the condition true pass may be executed without executing a flush operation. The GPU may execute a condition false pass if the result of the query pass is "false." The condition false pass may also be executed without executing a flush operation. Responsive to conditionally executing one of the condition true pass or the condition false pass based on the results of the query pass, the GPU may then execute a flush operation.

Accordingly, in some aspects of this disclosure, waiting for query results may be transferred from the application to the GPU. In other words, the GPU may wait for the results of the query rather than the application. This is possible because the application may, in some examples, send the GPU both the IB2 for the condition "true" case and the IB2 for the condition "false" case. Accordingly, the GPU has what the application would render and what the application wants to execute for both the "true" case and the "false" case because each of the IB2s contain commands for various aspects of the rendering pipeline for its respective case, e.g., the condition "true" case and the condition "false" case for the "true" query results and the "false" query result respectively.

Additional queries and follow on pass renderings may follow: For a tiled system, this may correspond to the following sequence: (1) a first pass rendering, also referred to as a coarse pass or a query pass in which a tiled-system may perform a binning pass that may generate a visibility stream, handle a loads, and renders, and stores for a rendering pass of the first pass; (2) a query check (may be by the application); the query check is a time when result of a query pass (the first pass) are checked; and (3) a second pass. The second pass may include all of the rendering done based on a query result of a first pass. In such an example, a tile-based system may perform a binning pass, generate visibility stream, and perform a load, a render, and a store for a rendering pass of this second pass (which may have a different set of detailed geometry based on application behavior, this is most likely the case). Accordingly, in a tile-based system, a bottleneck may occur due to bus accesses that may trigger binned rendering for both passes. Thus, any optimizations gained by the use of visibility streams may be minimized because an application implementing these steps may cause extra flushes for being able to perform a query pass to determine data, e.g., counter values or heuristics that indicate if the binning pass should be executed. These counter values or heuristics may also be referred to as query pass rendering statistics. Additionally, generally the data, e.g., counter values or heuristics that indicate if the binning pass should be executed may be generated or determined as part of the initial passes.

In general, in some examples, a graphics application triggers a query, renders a coarse pass (first pass), and then ends then query. The graphics application may check the query value (i.e., the number of pixels passed to detect if detailed rendering is required). Based on the query result (the graphics application may trigger a second pass). When the query is true a detailed scene may be rendered, when the query is false the scene may not be rendered at all or the coarse or but color pipe enable scene may be rendered. Accordingly, the second pass may include all of the rendering, which may or may not be performed based on the query result of the first pass.

Some examples may modify the behavior of applications in order to use tile-based architecture in their advantage for multi-pass rendering. Some examples may define new execution points and transfer complete control to the GPU and the graphics driver. For example, some examples may (1) Call Start_Query_Pass in a first pass with introduced query conditions, (2) Submit rendering calls for query_pass, (3) End query_pass (Call Query_Pass_End), (4) call Start_Condition_true pass, (5) Submit rendering calls for condition_true_pass, (6) Call End_condition_true_pass, (7) Call Start_Condition_false pass, (8) Submit rendering calls for condition_false_pass, and (9) call End_condition_false_ pass.

In one example, an Indirect Buffer 1 (IB1) may call a query pass, a binning pass or a rendering pass. The query pass, binning pass and rendering pass may be part of Indirect Buffer 2 (IB2). IB1 and IB2 are buffers, e.g., multi-level buffers. Commands in the top layer buffer (IB1) may be used to call an entire set of commands in a lower level buffer (IB2). In an example, the query pass may be executed by a command in the IB1 calling the query pass IB2 which may contain all the commands for the query pass. Another IB2 may contain all the commands for binning, and yet another IB2 may contain all the commands for rendering, etc. For example, the query pass, binning pass and rendering pass may each be separate IB2's, i.e., separate entities within an IB2 level buffer. The query pass may run before the binning pass. The binning pass may run before the rendering pass. In some cases, the binning pass may be skipped such that the rendering pass is run immediately after the query pass. In some cases, neither the binning pass nor the rendering pass are executed after a query pass.

For example, the query pass may return data, e.g., counter values or heuristics that indicate if the binning pass should be executed. In an example, a conditional execution determination unit may determine if a binning pass or a rendering pass should be executed. The determination on performing the binning pass may be based on the complexity of the object to be rendered. For example, for simply objects the binning pass may be skipped. Conversely, for more complex objects, the binning pass may be performed. Thus, the binning pass may be skipped such that the rendering pass is run immediately after the query pass for more simply objects. Additionally, for simply objects, the render may be performed in a single iteration, e.g., the entire screen may be written in a single pass rather than in a series of blocks. This may be possible for very simple, repetitive screen renders.

Figure 1:
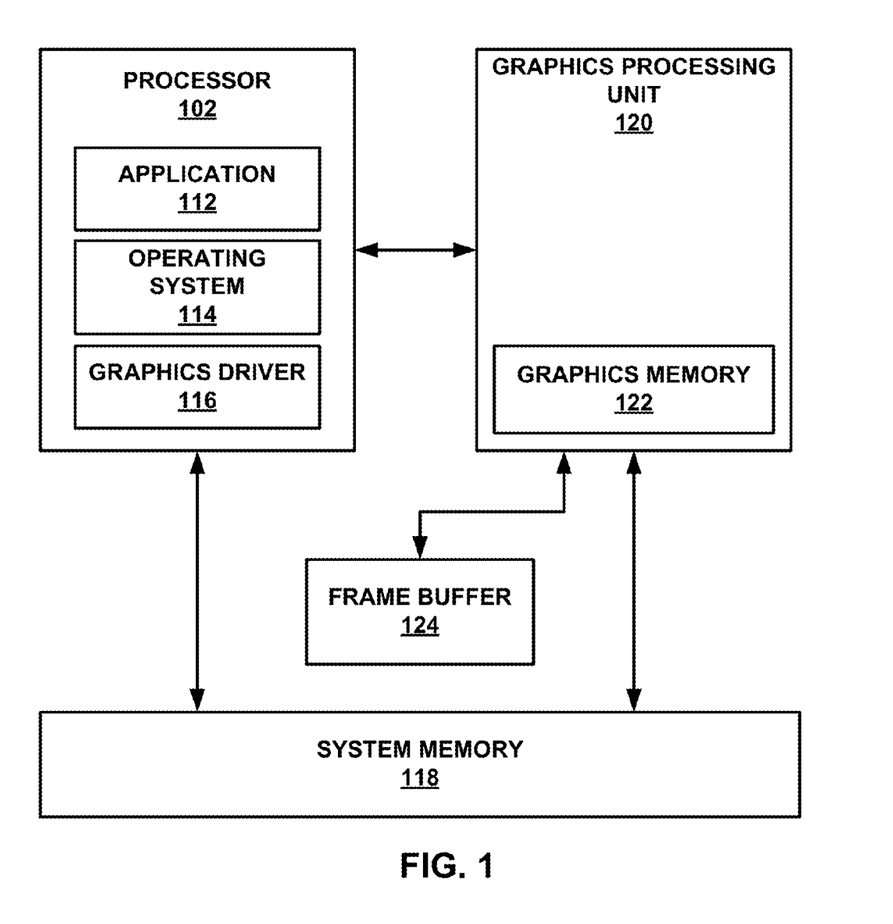
FIG. 1 is a block diagram illustrating a processor, a graphics processing unit, and a system memory used to render three dimensional scenes according to some aspects of the present disclosure.

FIG. 1 is a block diagram illustrating a processor 102, a graphics processing unit (GPU) 120, and a system memory 118 used to render a three dimensional (3D) scene according to some aspects of the present disclosure. Processor 102 may execute software application 112, operating system (OS) 114, and graphics driver 116. System memory 118 may include indirect buffers that store the command streams for rendering primitives as well as secondary commands that are to be executed by GPU 120. GPU 120 may include GMEM 122. GMEM 122 may be the GMEM described above. In some examples, GMEM 122 may be "on-chip" with GPU 120. In some cases, all hardware elements show in FIG. 1 may be on-chip, for example, in a system on a chip (SoC) design.

In the example of FIG. 1, processor 102, system memory 118, and GPU 120 may be part of a device. Examples of the device include, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

Processor 102 may be the central processing unit (CPU). GPU 120 may be a processing unit configured to perform graphics related functions such as generate and output graphics data for presentation on a display, as well as perform non-graphics related functions that exploit the massive processing parallelism provided by GPU 120. For example, GPU 120 may execute both graphics applications and non-graphics applications. Because GPU 120 may provide general-purpose processing capabilities in addition to graphics processing capabilities, GPU 120 may be referred to as a general purpose GPU (GP-GPU).

Examples of processor 102 and GPU 120 include, but are not limited to, a digital signal processor (DSP), a general purpose microprocessor, application specific integrated circuit (ASIC), field programmable logic array (FPGA), or other equivalent integrated or discrete logic circuitry. In some examples, GPU 120 may be a microprocessor designed for specific usage such as providing massive parallel processing for processing graphics, as well as for executing non-graphics related applications. Furthermore, although processor 102 and GPU 120 are illustrated as separate components, aspects of this disclosure are not so limited. For example, processor 102 and GPU 120 may reside in a common integrated circuit (IC).

Software application 112 that executes on processor 102 may include one or more graphics rendering instructions that instruct processor 102 to cause the rendering of graphics data to a display (not shown). In some examples, the graphics rendering instructions may include software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, processor 102 may issue one or more graphics rendering commands to GPU 120 (e.g., through graphics driver 116) to cause GPU 120 to perform some or all of the rendering of the graphics data. In some examples, the graphics data to be rendered may include a list of graphics primitives, e.g., points, lines, triangles, quadrilaterals, triangle strips, etc.

GPU 120 may be configured to perform graphics operations to render one or more graphics primitives to a display. Accordingly, when one of the software applications executing on processor 102 requires graphics processing, processor 102 may provide graphics commands and graphics data to GPU 120 for rendering to the display. The graphics data may include, e.g., drawing commands, state information, primitive information, texture information, etc. GPU 120 may, in some instances, be built with a highly-parallel structure that provides more efficient processing of complex graphic-related operations than processor 102. For example, GPU 120 may include a plurality of processing elements that are configured to operate on multiple vertices or pixels in a parallel manner. The highly-parallel nature of processor 102 may, in some instances, allow GPU 120 to draw graphics images (e.g., GUIs and two-dimensional (2D) and/or three-dimensional (3D) graphics scenes) onto the display more quickly than drawing the scenes directly to the display using processor 102.

GPU 120 may be directly coupled to GMEM 122. In other words, GPU 120 may process data locally using a local storage, instead of off-chip memory. This allows GPU 120 to operate in a more efficient manner by eliminating the need of GPU 120 to read and write data via, e.g., a shared bus, which may experience heavy bus traffic. In some instances, however, GPU 120 may not include a separate memory, but instead utilize system memory 118. GMEM 122 may include one or more volatile or non-volatile memories or storage devices, such as, e.g., random access memory (RAM), static RAM (SRAM), dynamic RAM (DRAM), and one or more registers.

Processor 102 and/or GPU 120 may store rendered image data in a frame buffer 124. Frame buffer 124 may be an independent memory or may be is allocated within system memory 118. A display processor (not shown) may retrieve the rendered image data from frame buffer 124 and display the rendered image data on a display.

System memory 118 may be a memory in the device and may reside external to processor 102 and GPU 120, i.e., off-chip with respect to processor 102, and off-chip with respect to GPU 120. System memory 118 may store applications that are executed by processor 102 and GPU 120. Furthermore, system memory 118 may store data upon which the executed applications operate, as well as the data that result from the application. Not all such data needs to be stored in system memory 118 in every example, however. In some instances, the data may be stored locally on processor 102 or GPU 120. For example, some or all of the data may be stored locally within on-chip GPU memory (e.g., a graphics memory, GMEM 122).

System memory 118 may store program modules, instructions, or both that are accessible for execution by processor 102, data for use by the programs executing on processor 102, or two or more of these. For example, system memory 118 may store a window manager application that is used by processor 102 to present a graphical user interface (GUI) on a display. In addition, system memory 118 may store user applications and application surface data associated with the applications. System memory 118 may act as a device memory for GPU 120 and may store data to be operated on by GPU 120 as well as data resulting from operations performed by GPU 120. For example, system memory 118 may store any combination of texture buffers, depth buffers, stencil buffers, vertex buffers, frame buffers, or the like.

System memory 118 may be an example of a computer-readable storage medium. For example, system memory 118 may store instructions that cause the processor 102 and GPU 120 to perform functions ascribed to each in this disclosure. System memory 118 may be considered as a computer-readable storage medium comprising instructions that cause one or more processors (e.g., processor 102 or GPU 120) to perform various functions.

Examples of system memory 118 include, but are not limited to, a random access memory (RAM), a read only memory (ROM), or an electrically erasable programmable read-only memory (EEPROM), or any other medium that can be used to carry or store desired program code in the form of instructions or data structures and that can be accessed by a computer or a processor. As one example, system memory 118 may be removed from the device, and moved to another device. As another example, a storage device, substantially similar to system memory 118, may be inserted into the device.

In accordance with techniques of the present disclosure, some examples may modifies the behaviour of applications in order to use tile-based architecture in their advantage for multi-pass rendering. In some examples, an application may use new execution points/backdoors/extension and transfers complete control to the GPU and the graphics driver.

For example, the GPU may call various entry points that "expose out" to the application, so that the GPU may provide an indication to the driver what is being submited to the the application. "Expose out" refers to entry points to blocks of code that provide functional pointers that may trigger code blocks when they are needed. In general, if an application calls; some start processor, i.e., StartXXX, the call ends up in the driver and in some examples, the following rendering/state calls are for XXX pass till an ending call, i.e., EndXXX is called. As a result all rendering/state calls between start and end of associated pass may be accumulated and used to build the indirect buffers for these passes. Example calls include a Start_Query_Pass (first pass) with introduced query conditions. The GPU may submit rendering calls for a query_pass as usual and may call Query_Pass_End. The GPU may also call Start_Condition_true pass and Set Query. The GPU may submit rendering calls for condition_true_pass. The GPU may also call End_condition_true_pass and Start_Condition_false_pass. The GPU may also submit rendering calls for condition_false_pass, call End_condition_false_pass. Accordingly, in an example, only one flush may be needed. A flush is a submission or a sending of all accumulated rendering commands to the operating system. When a graphics application triggers rendering commands they are not directly send to hardware, e.g., the screen. Rather, they are accumulated (translated as needed) by the graphics driver. A flush call is the boundary where there renderings are required to be handled and driver sends/submits all accumulated commands/buffers to the hardware through the operating system kernel.

In some examples an application may not need to flush until all data is sent. Additionally, the application may not need to explicitly check the query data. In an example, hardware may execute a query pass, a binning pass, and a rendering pass. As a result, the binning pass may be triggered once for the matching rendering pass based on the query result. Generally, for a well written application this pass may require more processing cycles to execute compared to other passes. Accordingly, the operation may be completed in a single flush point with better utilizations of the hardware resources. Accordingly, various examples may eliminated unnecessary load/stores (resolve/unresolves) and flush points.

Figure 2:
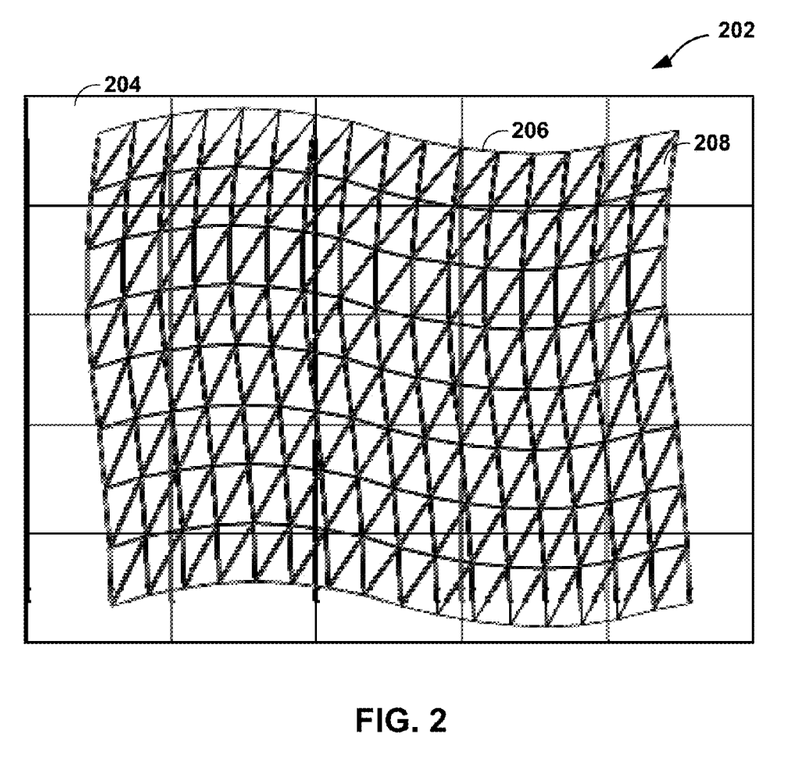
FIG. 2 a conceptual diagram illustrating tiles of a scene in a tile-based rendering architecture according to some aspects of the present disclosure.

FIG. 2 a conceptual diagram illustrating tiles of a scene in a tile-based rendering architecture. As shown in FIG. 2, a 3D graphical object 206 that is to be rendered by a GPU, such as GPU 120 shown in FIG. 1, may be made up of primitives, such as a primitive 208. In the example shown in FIG. 2, the primitives may be triangles that include three vertices. In other examples, the primitives may be points, lines, and the like. 3D scene 202 containing graphical object 206 can be divided up into tiles, such as a tile 204. The size of each tile, such as tile 204, of scene 202 may be determined based at least in part on the size of the GMEM. For example, each tile of scene 202 may be sized so that the portion of the scene 202 contained in a tile may be entirely rendered in the graphics memory, such as GMEM 122 shown in FIG. 1. Each tile of scene 202 may be considered to be a bin that includes the triangles in that tile. In one example, the width and height of the bin may be aligned by 32 pixels. Because scene 202 is divided into a 5×5 grid of tiles, there are a total of 25 tiles for scene 202 shown in FIG. 2.

GPU 120 may render a triangle by executing a command for rendering the triangle. Accordingly, GPU 120 may render graphical object 206 by executing commands for rendering each of the triangles making up graphical object 206. GPU 120 may sort the triangles of a scene into bins, so that each bin may include a command stream (a set of commands) to render the triangles included in the bin. Because there are a total of 25 tiles for scene 202, there may be 25 corresponding bins for scene 202. The command stream for each bin may be stored in an indirect buffer in memory, such as system memory 108 shown in FIG. 1. GPU 120 renders the graphical object 206 by executing the command stream of each bin to render the triangles in each of the bins onto GMEM 122.

In some examples, to render a scene, GPU 120 executes a first coarse pass. GPU 120 may then a second fine pass. During the first coarse pass, GPU 120 may determine whether triangles in each of the bins are visible. In previous techniques, after the GPU completes the first pass, the CPU executes a flush operation. The flush operation stores the results of the first pass and returns the results to the CPU. The results may include e.g., which triangles are visible, and which are not visible, etc.

Based on the results of the query operation, e.g., which triangles are visible, and which are not visible, the CPU generates parameters for the second pass. During the second pass, the GPU performs a second binning pass. The GPU also generates a visibility stream during the second pass. The GPU may generate a new visibility stream during the second pass. Using this new visibility stream the GPU to perform the second rendering pass. After the second pass, the GPU performs another flush operation. In the second flush operation the contents of the GMEM may be written to a graphics buffer or to system memory 118.

After GPU 120 renders the portion of scene 202 contained in a bin onto GMEM 122, that rendered portion of scene 202 may be loaded from GMEM 122 to a memory, such as frame buffer 124 shown in FIG. 1. GPU 120 may repeat the process of executing the command stream, rendering the triangles of the bin onto GMEM 122, and loading the rendered portion of the scene 202 from GMEM 122 to a frame buffer 124 for each bin to render the scene 202 in its entirety.

As described herein, "binning" or "tile-based rendering" is a way to render a 3D scene in smaller parts. Since 3D rendering is very heavy on memory bandwidth, it is useful to use GMEM, a specialized graphics memory, with high bandwidth close to the 3D core. In a mobile environment, however, the size of the GMEM is limited because of the area constraints. Therefore, the scene may need to be split into smaller parts so that each may be rendered separately.

In another example, a faceness stream may be used, but it may be applied to each bin separately. The faceness stream in other examples may include bit-per-triangle data that indicates if the triangle is front-facing or back-facing. In such an example, this may be extended to visibility stream, where each bit indicates whether the triangle is visible at all for the given bin. There is one visibility stream for each bin, listing triangles that are visible for that bin. The visibility value may be calculated using multiple factors: (1) if the triangle is backface-culled, (2) if it hits the bin area (including Z direction), (3) if it is occluded by the low-resolution Z check.

In an example, during the binning pass, multiple visibility streams are created, one for each bin. During the rendering pass, just one visibility stream is read (the one for the current bin). In addition, the visibility stream is compressed. This may result in smaller memory consumption. It may also enables fast skipping of invisible triangles during the rendering stage.

In an example, visibility streams may be generated during a binning pass. This may involve processing the command stream of a whole scene. Generally, however, no pixel shading is done. The creation may include the following stages: (1) vertex shading with bin shader, (2) low-resolution rasterization, (3) low-resolution Z test, and (4) visibility stream compression.

In both examples, the binning pass requires a specific binning shader. This may be a modified version of the vertex shader, where the only output is the vertex position. All parameter exports may be removed from the binning shader, as well as any calculations related to them. In some examples, however, there is no need to add any specific bin-related shader code. (It may be possible to use the normal vertex shader as the binning shader during initial stages of the driver development as well. In this case, there should be appropriate pixel shader in use as well, but it's not just receiving any pixels ever.)

From the shaded vertices, the rasterizer generates low-resolution representation of triangles, where each pixel equals 4×4 pixel area in the final image. The generated low-resolution pixels can have two values: partially covered or fully covered. The rasterization uses the same culling rules (faceness, frustum etc.) that normal rasterization, and therefore produces only those triangles that really contribute to the scene.

The third stage in the process is the low-resolution Z test. The GMEM can be used as a Z buffer also during the binning pass. Since the rendering is done in 4×4 pixel blocks, also the Z-buffer in GMEM is in this resolution. Furthermore, no color buffer in GMEM is needed. This means that the low-resolution Z-buffer (LRZ-buffer) can cover very large on-screen area compared to the full resolution. As the LRZ-buffer is not operating at the full resolution the LRZ-processing needs to be conservative. Writes to the LRZ-buffer are only done for pixels covered fully by the triangle, and partially covered pixels don't contribute to the Z writes. This also means that the LRZ-buffer isn't entirely accurate, as there can be gaps at the triangle edges. At the end of the binning pass, LRZ buffer can be written out to the external memory, and later it can be used for initializing the Z-buffer during the rendering pass. This provides improved Z testing during rendering.

Figure 3:
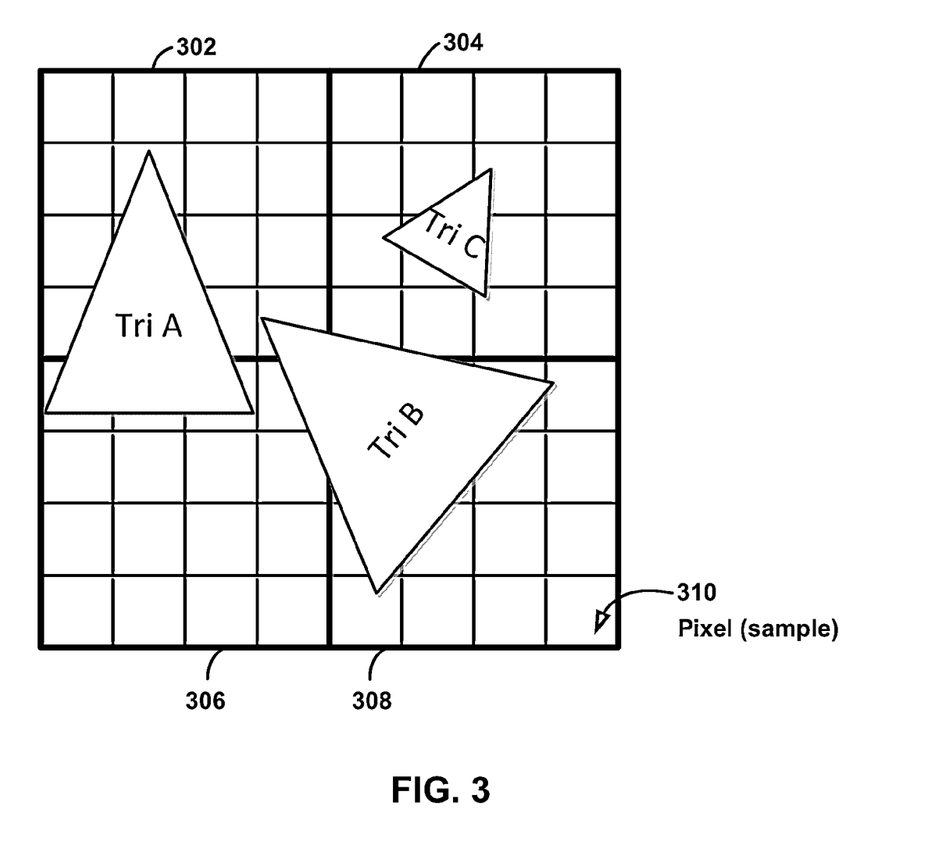
FIG. 3 is a conceptual diagram showing primitives divided amongst bins according to aspects of the present disclosure.

FIG. 3 is a conceptual diagram showing primitives divided amongst bins according to aspects of the present disclosure. As shown in FIG. 3, bins 302, 304, 306 and 308 that each contains a 4×4 grid of pixels are rendered/rasterized to contain multiple pixels 310. Generally, video rendering is the process of generating an image based on an existing object or model. Rasterisation (or rasterization) is generally taking an image described in a vector graphics format (e.g., shapes) and converting it into a raster image (e.g., pixels or dots) for output on a video display or printer, or for storage in a bitmap file format.

One or more graphics primitives may be visible in each bin. For example, portions of triangle A (Tri A) are visible in both bin 302 and bin 306. Portions of triangle B (Tri B) are visible in each of bin 302, bin 304, bin 306, and bin 308. Triangle C (Tri C) is only visible in bin 304. During a rendering pass, GPU 120 may split a scene into bins and may assign triangles to the bins. If the triangle is visible in more than one bin, GPU 120 may assign the triangle to just one of the bins in which the triangle is visible, so that the triangle is not rendered multiple times as each of the bins 302, 304, 306, and 308 are rendered.

GPU 120 may also determine which triangles in the bin are actually visible in the final rendered scene. For example, some triangles may be behind one or more other triangles and will not be visible in the final rendered scene. In this way, triangles that are not visible need not be rendered for that bin.

While performing a particular rendering pass, the pixel data for the bin associated with that particular rendering pass may be stored in a graphics memory, such as GMEM 122 shown in FIG. 1 (sometimes called a bin buffer). After performing the rendering pass, GPU 120 may transfer the contents of GMEM 122 to frame buffer 124. In some cases, the GPU 120 may overwrite a portion of the data in frame buffer 124 with the data stored in GMEM 122. In other cases, GPU 120 may composite or combine the data in the frame buffer 124 with the data stored in GMEM 122. After transferring the contents of GMEM 122 to frame buffer 124, GPU 120 may initialize the GMEM 122 to default values and begin a subsequent rendering pass with respect to a different bin.

Figure 4:
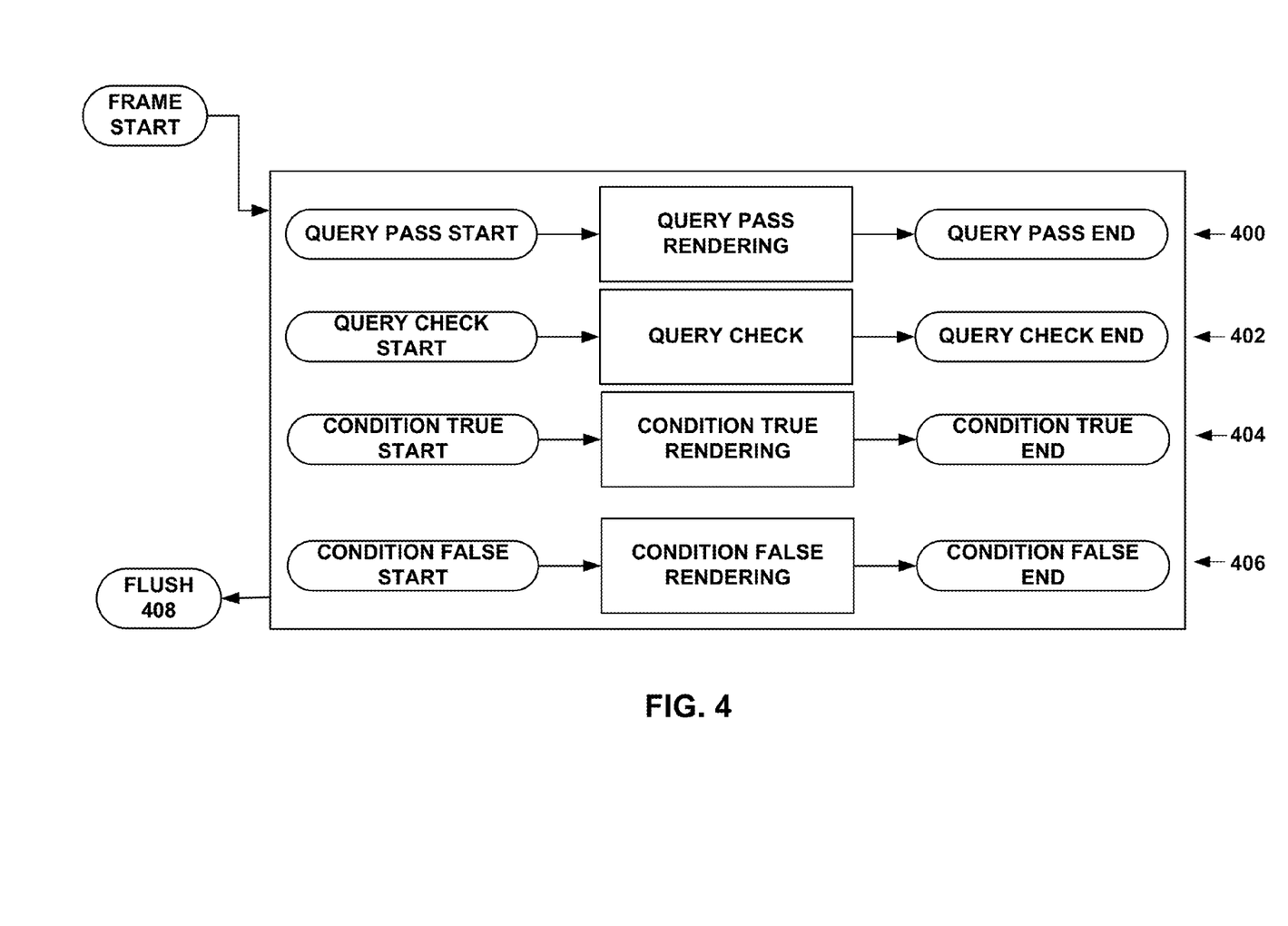
FIG. 4 is a conceptual diagram illustrating techniques for performing multi-pass rendering according to the techniques of this disclosure.

FIG. 4 is a conceptual diagram illustrating techniques for performing multi-pass rendering according to the techniques of this disclosure. Generally, this may allow for only performing the flush once. The functions may be perform from "top-to-bottom" and from "left-to-right" as the functions are oriented in FIG. 4. More specifically, as illustrated in FIG. 4, a query pass 400 may be performed followed by a condition true pass 404, a condition false pass 406, and performing a flush operation 408 once the three passes, query pass 400, condition true 404, and condition false 406 complete. Accordingly, in some examples, the techniques of this disclosure may eliminate a flush operation 408 that occurs after GPU 120 completes a query pass by modifying the behavior of applications, which utilize tile-based GPU architectures. In particular, in some examples, the techniques of this disclosure may include new execution points, backdoor commands, and/or extensions. These new execution points, backdoor commands, and/or extensions may allow GPU 120 and the graphics driver to eliminate the second query operation described above. In some examples, the techniques of this disclosure modify the DirectX 11 graphics API to include additional rendering commands that allow GPU 120 to eliminate the flush command.

When performing multi-pass tile-based rendering, GPU 120 generally perform a Query pass 400 and a query check 402, followed by a condition true pass 404, and a condition false pass 406. A query check 402 may be any request for information triggered by an application. For example, an application may render something on the API side, flush the object rendered to the graphics card. This completes that particular rendering. Then a query may be sent. The query may be the number of pixels passed when the render was flushed to the graphics card from the API. The query can be any request for information on the state of the last rendering or the current rendering job being performed that is supported by the hardware. In some cases, an application may render something, trigger a query, and only send data based on the query result.

In accordance with some examples of the instant application, the application may send a query and multiple IB2s. As described above, IB2s contain commands for various aspects of the rendering pipeline.

In one example, two query results may be possible, "true" and "false." Accordingly, the application may send two IB2s, one IB2 for a "true" query result and one IB2 for a "false" query result. Thus, commands for various aspects of a rendering pipeline for the "true" query result may be sent and commands for various aspects of a rendering pipeline for the "false" query result may be sent. The application sends both possibilities, the IB2 for the "true" query result and the IB2 for the "false" query result.

Because the application sends both the IB2 for the "true" query result and the IB2 for the "false" query result the application does not need to wait to send data based on the query result. Rather, the GPU will have both the IB2 for the "true" query result and the IB2 for the "false" query result sent by the application and it may wait for the result of the query. Thus, rather than have the application wait, the GPU may wait for the query results and then the GPU may execute the query pass. The GPU may execute a condition true pass if the result of the query pass is "true." Additionally, the condition true pass may be executed without executing a flush operation 408. The GPU may execute a condition false pass if the result of the query pass is "false." The condition false pass may also be executed without executing a flush operation 408. Responsive to conditionally executing one of the condition true pass or the condition false pass based on the results of the query pass, the GPU may then execute a flush operation 408.

Accordingly, in some aspects of this disclosure, waiting for query results may be transferred from the application to the GPU. In other words, the GPU may wait for the results of the query rather than the application. This is possible because the application may, in some examples, send the GPU both the IB2 for the condition "true" case and the IB2 for the condition "false" case. Accordingly, the GPU has what the application would render and what the application wants to execute for both the "true" case and the "false" case because each of the IB2s contain commands for various aspects of the rendering pipeline for its respective case, e.g., the condition "true" case and the condition "false" case for the "true" query results and the "false" query result respectively.

The Query pass 400 determines whether triangles are visible or not, and establishes conditions for the condition true pass 404 and condition false pass 406. Once GPU 120 completes Query pass 400, GPU 120 executes condition true pass 404, and then condition false pass 406. The condition true pass and the condition false pass have different data and rendering commands accumulated in them based on applications rendering sequences.

The techniques of this disclosure may include rendering instructions that may specify the beginning and the end of the rendering pass that GPU 120 is executing. Accordingly, some example techniques of this disclosure include rendering instructions that may specify the beginning and the end of, for example, the query pass 400, the condition true pass 404, and the condition false pass 406. In particular, some example techniques of this disclosure include entry points such as Start_Query_Pass command, an End_Query_Pass command, a Start_Condition_True_pass, and End_condition_true_pass, and an End_condition_false_pass command. These are the entry points that are "exposed out" to allow different code subroutines to be accessed. Again, "expose out" refers to entry points to blocks of code that provide functional pointers that may trigger code blocks when they are needed. As described herein, these are entry points that are exposed out to the application so that the application can provide an indication to the driver of what is being submitted by the application to the driver.

In an example, in between each pair of corresponding commands, e.g., query pass start and query pass end, condition true start and condition true end, condition false start and condition false end, a graphics driver or application specifies a rendering commands for GPU 120 to execute during that rendering pass. Once all of the passes complete, GPU 120 executes a flush command. Flush command may write the results of the three passes, query pass 400, condition true 404, and condition false 406 to system memory 118.

As described herein, the query pass 400 may run before the binning pass. The binning pass may run before rendering pass, e.g., the rendering for condition true pass 404 or the rendering for condition false pass 406. (The binning pass is not illustrated in FIG. 4.) In some cases, the binning pass may be skipped such that rendering pass 404 or 406 is run immediately after the query pass 400. In some cases, neither the binning pass nor rendering pass, e.g., the rendering for condition true pass 404 or the rendering for condition false pass 406 are executed after a query pass 400. For example, a condition false pass may cause the binning pass and the rendering pass to not be executed, although this may not always be the case. In some examples, however, the binning pass and the rendering pass to be executed for a condition false pass. The binning pass and the rendering pass may be executed for a condition true pass. The main difference between the condition true pass and the condition false pass are have different data and rendering command accumulated in them based on applications rendering sequences.

The query pass 400 may return data that indicates if the binning pass should be executed. In an example, a conditional execution determination unit may determine if a binning pass or a rendering pass, e.g., the rendering for condition true pass 404 or the rendering for condition false pass 406 should be executed. The determination on performing the binning pass may be based on the complexity of the object to be rendered. For example, for simply objects the binning pass may be skipped. Conversely, for more complex objects, the binning pass may be performed. As described herein, a condition true rendering and condition false rendering may occur. The query pass and the condition true rendering and the condition false may occur before a flush 408.

As described herein, some examples do not flush until all data is queued. For example, query pass 400, render pass 404, and render pass 406 may each be queued for flush 408 rather than performing a flush after each of query pass 400, render pass 404, and render pass 406. Accordingly, a single flush 408 may be performed. This may be conditional and may be based on the query. As described herein, in some examples, GPU 120 completes query pass 400, render pass 404, and render pass 406, as well as flush 408. Flush 408 may send the data to processor 102, for use by operating system 114. The data may be data from accumulated rendering commands. As described herein, in some examples, a flush is a submission or sending of all accumulated rendering commands to operating system 114. When a graphics application triggers the rendering command, the graphics driver does not directly send the accumulated rendering commands to hardware. The render commands are accumulated (translated as needed) by the graphics driver.

Additionally, in some examples it does not matter what the query value is. Accordingly, there may be no need to lock a memory location such that values cannot be written to the locked memory location, e.g., because it may not matter if the memory location is overwritten. It may not be necessary to get a call back, etc. In some examples, the memory driver may execute a pre binning pass/query pass that does not contribute to the visibility stream. In some examples, a memory driver may perform a binning pass. The binning pass is conditionally executed. A query result may be returned from query check 402. Query check 402 may return a value of "true" or "false." Based on the true or false result of a query a scene may be rendered. In other words, the binning pass is conditionally executed based on the query result of true or false. A true query result may result in render pass 404, while a false query result may result in render pass 406.

When the condition or value returned by the binning pass is true, the condition true rendering 404 may contribute to visibility stream. Alternatively, if the condition or value returned by the binning pass is false the condition false rendering 406 contributes to visibility stream as a rendering IB2. The rendering passes 404 and 406 are conditionally executed. The binning pass may be triggered once for the correct rendering pass. The correct visibility stream and optimizations may then be performed. The rendering pass may be performed on only the correct geometry and not one the query pass. The operation may be completed in a single flush point.

For example, some devices may perform a method for multi-path graphics rendering on tile-based architectures. Such devices may include a GPU that executes a query check 402, a condition true pass 404 based on the query pass without executing a flush operation 408, a condition false pass 406 based on the query pass without executing a flush operation 408. Generally, either, a condition true pass 404 or condition false pass 406 is performed based on the results of a given query check 402. Responsive to executing the condition true pass, and the condition false pass, the GPU may execute a flush operation 408. In some examples, either a condition true or a condition false may result in a binning pass, which generates the visibility stream. Alternatively, either of these, the condition true or the condition false, may use a direct render pass in rendering a scene.

In some examples, the query pass, e.g., query check 402, may include a first query pass. The executing of the first query pass may include executing a graphics rendering command that indicates a start of the first query pass. Additionally, in some examples, executing the first query pass further includes executing a graphics rendering command that indicates an end of the first query pass. In some examples, executing the condition false pass further includes executing a graphics command that indicates an end of the condition false pass. In some examples, executing a start condition pass further includes a graphics rendering command that indicates an end of the start condition pass. In some examples, executing the condition true pass further includes executing a graphics rendering command that indicates an end of a first query pass. In some examples, executing the condition false pass further comprises executing a graphics command that indicates a start of the condition false pass.

Figure 5:
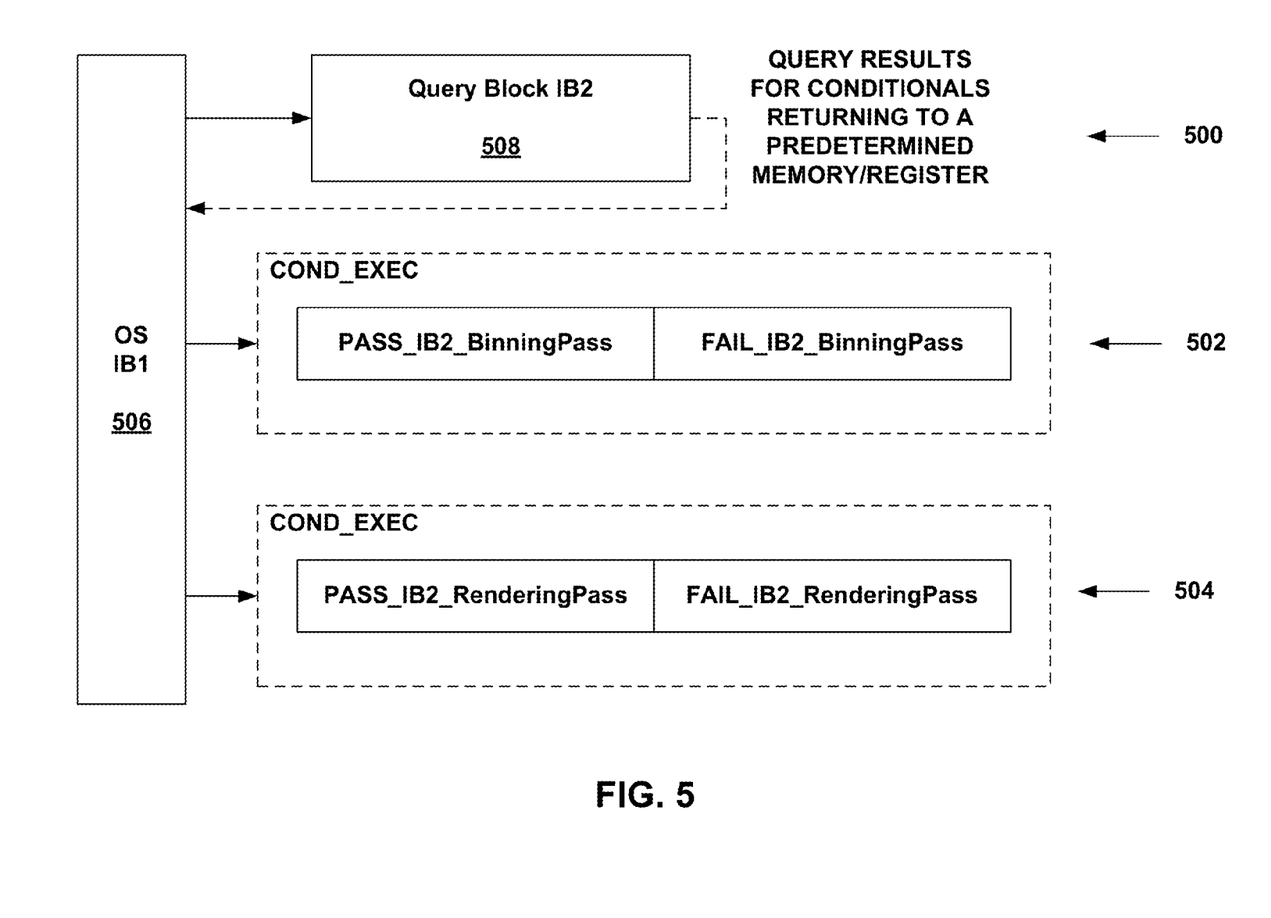
FIG. 5 is a conceptual diagram illustrating an example of functions that may be executed by hardware in accordance with one or more examples described in this disclosure.

FIG. 5 is a conceptual diagram illustrating an example of functions that may be executed by hardware in accordance with one or more examples described in this disclosure. In the illustrated example of FIG. 5 a query pass 500 may be executed in hardware. A binning pass 502 may also be executed in hardware. Additionally, a rendering pass 504 may be executed in hardware. In some examples, the hardware may include GPU 120 or other processing hardware. Query pass 500, binning pass 502, and rendering pass 504 may be controlled by operating system 506. Operating system 506 may initiate a query pass 500. In some examples, the rendering pass includes the execution of one of a condition true pass and a condition false pass based on the results of a query result. The results may control both binning and rendering of the second pass.

The query pass 500 may be executed in query block 508, which may return query results to a predetermined memory or a predetermined register. Operating system 506 may cause the query results to be stored in the predetermined memory or a predetermined register. Additionally, the query results that may be stored in the predetermined memory or a predetermined register may be used by binning pass 502, rendering pass 504, or both. For example, the query results may be used in conjunction with multi-pass rendering a scene and associated objects. In the multi-pass rendering the scene and associated objects may be rendered multiple times. Each time the object is drawn an additional aspect of object's appearance may be calculated and combined with the previous results. Generally, this may involve a coarse initial rendering and a detailed second rendering pass based on the query results of first coarse pass. The query results may be checked during the query check and may result in a condition true query result or a condition false query result. As described above, the query may be any request for information triggered by an application. The query result may then result in a condition true graphics rendering 404 by executing a condition true queue or the query result may then result in a condition false graphics rendering 406 by executing a condition false queue.

Binning pass 502 is conditional. During binning pass 502, the GPU may generate polygons (e.g., triangles) that make up a scene and sort the polygons to a plurality of "bins." As described herein, the bins defined during binning pass 502 may directly relate to tiles of a final scene presented on a display (e.g., sometimes referred to as "screen tiles"). For example, each bin represents a portion, or tile of the final scene (e.g., a predefined portion of a frame of video data, computer-generated graphics image, still image, or the like). Accordingly, the terms "bin" and "tile" may be used herein interchangeably.

In some examples, the GPU also performs operations during binning pass 502 to determine which of the polygons are visible in the scene, such as performing a depth test to determine whether a polygon covers another polygon. Upon determining which polygons are visible in the scene, the GPU can generate a stream of data referred to as a "visibility stream." The visibility stream may include a value for each of the polygons of the scene, and the value may represent whether the polygon is visible (e.g., a value of "1" may indicate that the polygon is visible and a value of "0" may indicate that the polygon is not visible).

Rendering pass 504 is also conditional. During rendering pass 504 each of the defined tiles are rendered. In some examples, each of the rendering passes may be completed in three stages: (1) clear/unresolve, (2) render, (3) resolve.

In some examples, a memory driver may execute the pre binning pass that does not contribute to the visibility stream. In some examples, a memory driver may perform a binning pass 502. Binning pass 502 is conditionally executed. For example, for a direct render, binning pass 502 may be skipped. In some examples, when binning pass 502 is conditionally executed, it may return a value indicating if it contributes to visibility stream. Alternatively, if the condition or value returned by binning pass 502 is false binning pass 502 contributes to visibility stream as a rendering IB2. Rendering pass 504 is also conditionally executed. When the condition is true, rendering pass 504 contributes to visibility stream. When rendering pass 504 is conditionally executed, it may also return a value of "true" or "false." When the condition is false, rendering pass 504 contributes to the visibility stream as a rendering IB2. Binning pass 502 may be triggered once for the correct rendering pass 504. The correct visibility stream and optimizations may then be performed. Rendering pass 504 may be performed on only the correct geometry and not one the query pass 500. The operation may be completed in a single Flush point.

In one example, an Indirect Buffer 1 (IB1) may call a query pass 500, a binning pass 502 or a rendering pass 504. Query pass 500, binning pass 502, and rendering pass 504 may be part of Indirect Buffer 2 (IB2). For example, query pass 500, binning pass 502 and rendering pass 504 may each be separate IB2's, i.e., separate entities within an IB2 level buffer. Query pass 500 may run before binning pass 502. Binning pass 502 may run before rendering pass 504. In some cases, binning pass 502 may be skipped such that rendering pass 504 is run immediately after query pass 500. In some cases, neither binning pass 502 nor rendering pass 504 are executed after a query pass 500.

For example, query pass 500 may return data, e.g., counter values or heuristics that indicate if binning pass 502 should be executed. In an example, a conditional execution determination unit may determine if binning pass 502 or rendering pass 504 should be executed. The determination on performing binning pass 502 may be based on the complexity of the object to be rendered. For example, for simply objects binning pass 502 may be skipped. Conversely, for more complex objects, binning pass 502 may be performed. Thus, binning pass 502 may be skipped such that rendering pass 504 is run immediately after query pass 500 for more simply objects. Additionally, for simply objects, rendering pass 504 may be performed in a single iteration, e.g., the entire screen may be written in a single pass rather than in a series of blocks. This may be possible for very simple, repetitive screen renders, for example.

As described herein, some examples do not flush until all data is send. Additionally, in some examples it does not matter what the query value is. Accordingly, there may be no need to lock a memory location, e.g., because it may not matter if the memory location is overwritten. It may not be necessary to get a call back, etc. In some examples, the memory driver may execute a pre binning pass/query pass that does not contribute to the visibility stream. In some examples, a memory driver may perform the binning pass 502. The binning pass 502 may be conditionally executed. In some examples, when binning pass 502 is conditionally executed, it may return a value indicating that it contributes to visibility stream. Alternatively, if the condition or value returned by binning pass 502 is false binning pass 502 contributes to visibility stream as a rendering IB2. Rendering pass 504 is also conditionally executed. When the condition is true, rendering pass 504 contributes to visibility stream. When rendering pass 504 is conditionally executed, it may also return a value of "true" or "false." When the condition is false, rendering pass 504 contributes to the visibility stream as a rendering IB2. Binning pass may be triggered once for the correct rendering pass. The correct visibility stream and optimizations may then be performed. Rendering pass 504 may be performed on only the correct geometry and not one query pass 500. The operation may be completed in a single Flush point.

For example, some devices may perform a method for multi-path graphics rendering on tile-based architectures. Such devices may include a GPU that executes a query pass, a condition true pass based on query pass 500 without executing a flush operation, a condition false pass based on query pass 500 without executing a flush operation, and responsive to executing the condition true pass, and the condition false pass, the GPU may execute a flush operation.

In some examples, query pass 500 may include a first query pass. The executing of the first query pass may include executing a graphics rendering command that indicates a start of the first query pass. Additionally, in some examples, executing the first query pass further includes executing a graphics rendering command that indicates an end of the first query pass. In some examples, executing the condition false pass further includes executing a graphics command that indicates an end of the condition false pass. In some examples, executing a start condition pass further includes a graphics rendering command that indicates an end of the start condition pass. In some examples, executing the condition true pass further includes executing a graphics rendering command that indicates an end of a first query pass. In some examples, executing the condition false pass further comprises executing a graphics command that indicates a start of the condition false pass.

Figure 6:
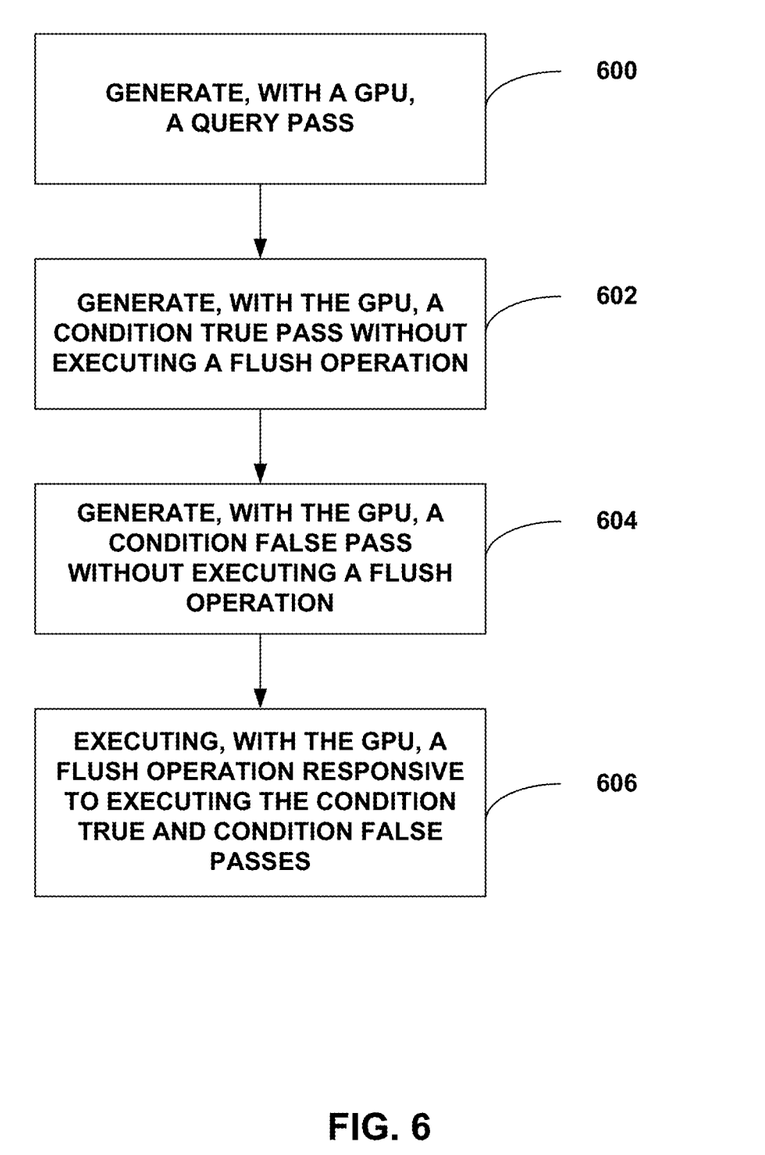
FIG. 6 is a flowchart illustrating an example method for multi-pass rendering on tile-based architectures in accordance with one or more examples described in this disclosure.

FIG. 6 is a flowchart illustrating an example method for multi-path graphics rendering on tile based architectures in accordance with one or more examples described in this disclosure. GPU 120 generates a query pass (600). Query pass 500 may further include a first query pass. Additionally, executing the first query pass may include executing a graphics rendering command that indicates a start of the first query pass. In some examples, executing the first query pass further include executing a graphics rendering command that indicates an end of the first query pass.

GPU 120 generates a condition true pass based on query pass 500 without executing a flush operation (602). In some examples, executing a start condition pass further includes a graphics rendering command that indicates an end of the start condition pass. Executing the condition true pass may also further include executing a graphics rendering command that indicates an end of a first query pass.

GPU 120 generates a condition false pass based on query pass 500 without executing a flush operation (604). In some examples, executing the condition false pass further includes executing a graphics command that indicates an end of the condition false pass. In some examples, executing the condition false pass further includes executing a graphics command that indicates a start of the condition false pass.

GPU 120 executes a flush operation responsive to executing the condition true pass and the condition false pass (606). A flush operation may be performed once the three passes, query pass 400, condition true 404, and condition false 406 are complete. Generally, this may allow for the performance of a single flush operation. Flush command 408, and may write the results of the three passes, query pass 400, condition true 404, and condition false 406 to system memory 118.

Figure 7:
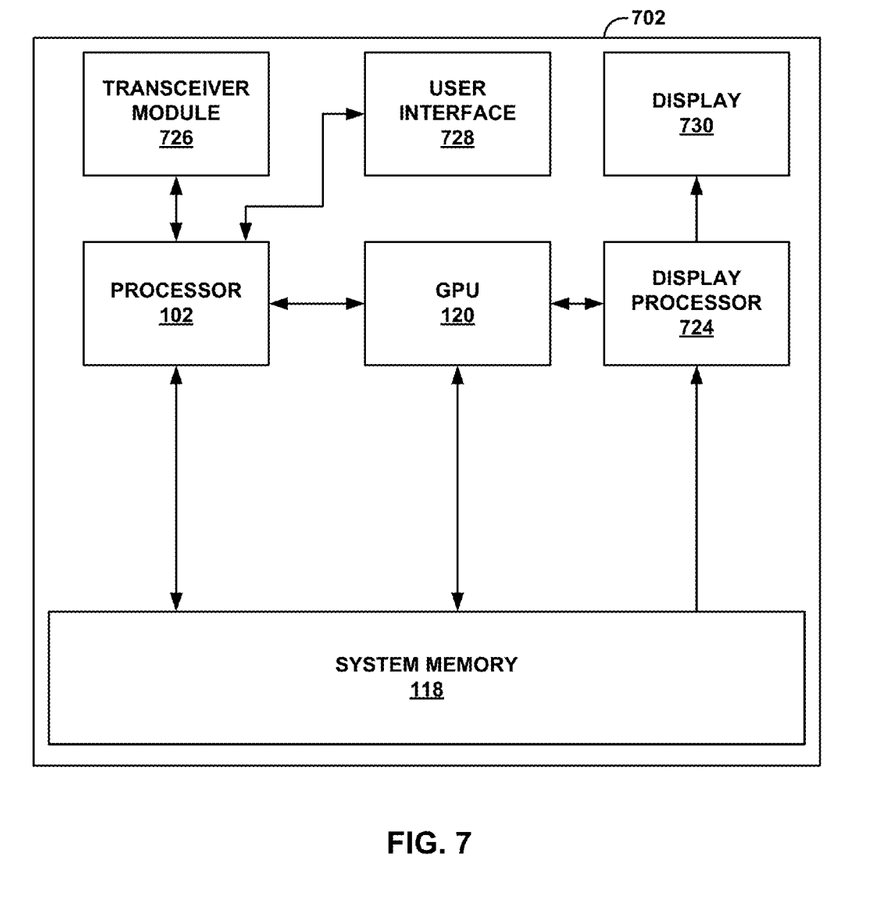
FIG. 7 is a block diagram illustrating an example of a device that may be configured to implement one or more aspects of the present disclosure.

FIG. 7 is a block diagram illustrating an example of a device that may be configured to implement one or more aspects of this disclosure. For example, FIG. 7 illustrates device 702. Examples of the device 702 include, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

In the example of FIG. 7, device 702 may include processor 10, system memory 118, and GPU 120. For purposes of brevity, processor 102, system memory 118, and GPU 120 are not further described with respect to FIG. 7, as these components have been previously described with respect to FIG. 1. Device 702 may also include display processor 724, transceiver module 726, user interface 728, and display 730. Transceiver module 726 and display processor 724 may both be part of the same integrated circuit (IC) as processor 102 and/or GPU 120. In another example, transceiver module 726 and display processor 724 may both be external to the IC or ICs that include processor 102 and/or GPU 120. In yet another example, transceiver module 726 and display processor 724 may be formed in the IC that is external to the IC that includes processor 102 and/or GPU 120.

Device 702 may include additional modules or units not shown in FIG. 7 for purposes of clarity. For example, device 702 may include a speaker and a microphone, neither of which are shown in FIG. 7. The speaker and microphone may be used to effectuate telephonic communications in examples where device 702 is a mobile wireless telephone. When device 702 is a media player it may include a speaker to provide sound output or it may include an output jack. Device 702 may also include a video camera. Furthermore, the various modules and units shown in device 702 may not be necessary in every example of device 702. For example, user interface 728 and display 730 may be external to device 702 in examples where device 702 is a desktop computer or other device that is equipped to interface with an external user interface or display.

Examples of user interface 728 include, but are not limited to, a touch screen, a trackball, a mouse, a keyboard, and other types of input devices. User interface 728 may also be a touch screen and may be incorporated as a part of display 730. Transceiver module 726 may include circuitry to allow wireless or wired communication between device 702 and another device or a network. Transceiver module 726 may include modulators, demodulators, amplifiers and other such circuitry for wired or wireless communication.

In some examples, GPU 120 may store a fully formed image in system memory 118. Display processor 724 may retrieve the image from system memory 118 and output values that cause the pixels of display 730 to illuminate to display the image. Display 730 may the display of device 702 that displays the image content generated by GPU 120. Display 730 may be a liquid crystal display (LCD), an organic light emitting diode display (OLED), a cathode ray tube (CRT) display, a plasma display, or another type of display device.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware, software modules, or a combination of these configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of intraoperative hardware units, including one or more processors as described above, in conjunction with suitable software, firmware, or both.

Various examples have been described. These and other examples are within the scope of the following claims.

The invention claimed is:

1. A method for multi-path graphics rendering on tile-based architectures, the method comprising:
   executing, with a graphics processing unit (GPU), a query pass;
   executing, with the GPU, a condition true pass based on the query pass without executing a flush operation;
   executing, with the GPU, a condition false pass based on the query pass without executing a flush operation; and
   responsive to executing the condition true pass and the condition false pass, executing, with the GPU, a flush operation.

2. The method of claim 1, wherein the query pass comprises a first query pass and executing the first query pass comprises executing a graphics rendering command that indicates a start of the first query pass.

3. The method of claim 2, wherein executing the first query pass further comprises executing a graphics rendering command that indicates an end of the first query pass.

4. The method of claim 1, wherein executing the condition false pass further comprises executing a graphics command that indicates an end of the condition false pass.

5. The method of claim 1, further comprising executing a direct render.

6. The method of claim 5, wherein executing the condition true pass further comprises executing a graphics rendering command that indicates an end of a first query pass.

7. The method of claim 1, wherein executing the condition false pass further comprises executing a graphics command that indicates a start of the condition false pass.

8. A device for multi-path graphics rendering on tile-based architectures comprising:
 a memory; and
 a GPU configured to:
  execute a query pass;
  execute a condition true pass based on the query pass without executing a flush operation;
  execute a condition false pass based on the query pass without executing a flush operation; and
  responsive to executing the condition true pass, and the condition false pass, executing a flush operation to write results of at least one of the query pass, the condition true pass, or the condition false pass to the memory.

9. The device of claim 8, wherein the query pass comprises a first query pass and executing the first query pass comprises executing a graphics rendering command that indicates a start of the first query pass.

10. The device of claim 9, wherein executing the first query pass further comprises executing a graphics rendering command that indicates an end of the first query pass.

11. The device of claim 8, wherein executing the condition false pass further comprises executing a graphics command that indicates an end of the condition false pass.

12. The device of claim 8, further comprising executing a direct render.

13. The device of claim 12, wherein executing the condition true pass further comprises executing a graphics rendering command that indicates an end of a first query pass.

14. The device of claim 8, wherein executing the condition false pass further comprises executing a graphics command that indicates a start of the condition false pass.

15. A device for multi-path graphics rendering on tile based architectures comprising:
 means for executing a query pass;
 means for executing a condition true pass based on the query pass without executing a flush operation;
 means for executing a condition false pass based on the query pass without executing a flush operation; and
 responsive to executing the condition true pass and the condition false pass, means for performing a flush operation.

16. The device of claim 15, wherein the query pass comprises a first query pass, wherein the means for executing the query pass comprises means for executing the first query pass, and wherein the means for executing the first query pass comprises means for executing a graphics rendering command that indicates a start of the first query pass.

17. The device of claim 16, wherein the means for executing the first query pass further comprises means for executing a graphics rendering command that indicates an end of the first query pass.

18. The device of claim 15, wherein the means for executing the condition false pass further comprises means for executing a graphics command that indicates an end of the condition false pass.

19. The device of claim 15, further comprising means for executing a direct render.

20. The device of claim 19, wherein the means for executing the condition true pass further comprises means for executing a graphics rendering command that indicates an end of a first query pass.

21. The device of claim 15, wherein the means for executing the condition false pass further comprises means for executing a graphics command that indicates a start of the condition false pass.

22. A non-transitory computer-readable storage medium, the computer-readable storage medium having stored thereon instructions for multi-path graphics rendering on tile based architectures that upon execution cause one or more graphics processing units (GPUs), to
 execute a query pass;
 executing a condition true pass based on the query pass without executing a flush operation;
 executing a condition false pass based on the query pass without executing a flush operation; and
 responsive to executing the condition true pass, and the condition false pass, executing a flush operation.

* * * * *